(12) United States Patent
Charbit et al.

(10) Patent No.: US 9,107,155 B2
(45) Date of Patent: Aug. 11, 2015

(54) SYNCHRONIZATION FOR DEVICE-TO-DEVICE COMMUNICATION

(71) Applicant: NOKIA CORPORATION, Espoo (FI)

(72) Inventors: Gilles Charbit, Hampshire (GB); Tao Chen, Salo (FI); Sami-Jukka Hakola, Kempele (FI); Timo Kalevi Koskela, Oulu (FI)

(73) Assignee: NOKIA TECHNOLOGIES OY, Espoo (FI)

( * ) Notice: Subject to any disclaimer, the term of this patent is extended or adjusted under 35 U.S.C. 154(b) by 0 days.

(21) Appl. No.: 14/319,439

(22) Filed: Jun. 30, 2014

(65) Prior Publication Data

US 2014/0341208 A1 Nov. 20, 2014

Related U.S. Application Data (62) Division of application No. 13/121,105, filed as application No. PCT/IB2009/006883 on Sep. 17, 2009, now Pat. No. 8,811,374.

(60) Provisional application No. 61/100,257, filed on Sep. 25, 2008.

(51) Int. Cl.
*H04J 3/06* (2006.01)
*H04W 56/00* (2009.01)
(Continued)

(52) U.S. Cl.
CPC ............... *H04W 56/00* (2013.01); *H04W 4/08* (2013.01); *H04W 56/002* (2013.01);
(Continued)

(58) Field of Classification Search
CPC .......... H04W 56/0045; H04W 56/002; H04W 76/023

USPC .......................................................... 370/350
See application file for complete search history.

(56) References Cited

U.S. PATENT DOCUMENTS 7,123,787 B1 * 10/2006 McIntyre ........................ 385/14
7,286,847 B2    10/2007 Ozluturk et al.
(Continued)

FOREIGN PATENT DOCUMENTS

CN          1521967 A       8/2004
CN          1536925 A      10/2004
(Continued)

OTHER PUBLICATIONS

Chinese Office Action application 200980137579.3 dated Aug. 11, 2014.
(Continued)

*Primary Examiner* — Asad Nawaz
*Assistant Examiner* — Syed S Ali
(74) *Attorney, Agent, or Firm* — Squire Patton Boggs (US) LLP (57) ABSTRACT

Various example embodiments are disclosed. According to one example embodiment, a method may include synchronizing, by an access node in a wireless network, with a first mobile station, synchronizing with a second mobile station, compiling a device-to-device group, the device-to-device group including at least the first mobile station and the second mobile station, sending a first connection message to the first mobile station, the first connection message including timing advance parameters of both the first mobile station and the second mobile station, and sending a second connection message to the second mobile station.

9 Claims, 8 Drawing Sheets (51) Int. Cl.
*H04W 76/02* (2009.01)
*H04W 4/08* (2009.01)
*H04W 52/24* (2009.01)
*H04W 52/28* (2009.01)
*H04W 52/36* (2009.01)
*H04W 52/38* (2009.01)
*H04W 52/50* (2009.01)

(52) U.S. Cl.
CPC ....... *H04W 56/0045* (2013.01); *H04W 76/023* (2013.01); *H04W 52/248* (2013.01); *H04W 52/283* (2013.01); *H04W 52/367* (2013.01); *H04W 52/383* (2013.01); *H04W 52/50* (2013.01)

(56) References Cited

U.S. PATENT DOCUMENTS

| | | | |
|---|---|---|---|
| 7,308,266 | B2 | 12/2007 | Du et al. |
| 7,336,638 | B2 | 2/2008 | Cheng et al. |
| 8,554,784 | B2 * | 10/2013 | Nurminen et al. ............ 707/769 |
| 2003/0073437 | A1 | 4/2003 | Yuen |
| 2003/0156594 | A1 | 8/2003 | Trott et al. |
| 2004/0142711 | A1 * | 7/2004 | Mahonen et al. ............ 455/502 |
| 2006/0148502 | A1 | 7/2006 | Korneluk et al. |
| 2006/0229092 | A1 | 10/2006 | Jia et al. |
| 2006/0245398 | A1 | 11/2006 | Li et al. |
| 2006/0251256 | A1 * | 11/2006 | Asokan et al. ................ 380/270 |
| 2006/0258383 | A1 | 11/2006 | Jiang et al. |
| 2006/0259560 | A1 | 11/2006 | Han et al. |
| 2007/0116033 | A1 * | 5/2007 | Reunamaki et al. .......... 370/445 |
| 2007/0183374 | A1 | 8/2007 | Classon et al. |
| 2007/0191016 | A1 | 8/2007 | Beasley et al. |
| 2007/0195731 | A1 | 8/2007 | Camp |
| 2008/0031184 | A1 | 2/2008 | Seo |
| 2008/0233964 | A1 | 9/2008 | McCoy et al. |
| 2008/0294793 | A1 | 11/2008 | Han et al. |
| 2009/0265470 | A1 * | 10/2009 | Shen et al. .................... 709/227 |
| 2009/0282130 | A1 * | 11/2009 | Antoniou et al. ............. 709/220 |
| 2009/0325625 | A1 | 12/2009 | Hugl et al. |
| 2010/0093364 | A1 * | 4/2010 | Ribeiro et al. ............. 455/452.2 |
| 2010/0141650 | A1 | 6/2010 | Abdo et al. |
| 2011/0002344 | A1 * | 1/2011 | Palin et al. .................... 370/428 |
| 2011/0191187 | A1 | 8/2011 | Charbit et al. |
| 2012/0093098 | A1 | 4/2012 | Charbit et al. |
| 2013/0272260 | A1 | 10/2013 | Bitran et al. |
| 2013/0273926 | A1 | 10/2013 | Peng et al. |

FOREIGN PATENT DOCUMENTS

| | | |
|---|---|---|
| CN | 1549612 A | 11/2004 |
| EP | 1593211 A1 | 11/2005 |
| WO | 2004/077919 A2 | 9/2004 |
| WO | 2004077920 A2 | 9/2004 |
| WO | 2005/060182 A2 | 6/2005 |
| WO | 2006/064411 A2 | 6/2006 |
| WO | 2007/055623 A1 | 5/2007 |

OTHER PUBLICATIONS

Office Action dated Jan. 28, 2014, issued in corresponding Chinese Patent Application No. 200980137579.3.

Office Action dated May 31, 2013, issued in corrresponding CN Patent Application No. 200980137579.3.

"3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 8)", 3GPP TS 36.300 v8.4.0, Mar. 2008, pp. 1-126.

"Draft TR Feasibility Study on Uplink TDOA in GSM and GPRS (Release 6)", 3GPP TSG GERAN #10, GP-021932, TruePosition, Jun. 24-28, 2002, 75 pages.

"Global Positioning System", Retrieved on Jan. 21, 2013, Available at: http://en.wikipedia.org/wiki/Global_Positioning_System, 35 pages.

"Update to 3GPP TS 22.071 for United States Specific Location Accuracy Requirements for US Implementations", 3GPP TSG-GERAN meeting #11, GP-022138, TruePosition, Aug. 26-30, 2002, 4 pages.

International Search Report received for corresponding Patent Cooperation Treaty Application No. PCT/IB2009/006883, dated Jan. 22, 2010, 12 pages.

Office Action dated Feb. 16, 2015, issued in corresponding CN Patent Application No. 200980137579.3.

* cited by examiner

SYNCHRONIZATION FOR DEVICE-TO-DEVICE COMMUNICATION

RELATED APPLICATION

This application is a divisional application of U.S. patent application Ser. No. 13/121,105, which was filed on Mar. 25, 2011, which is a U.S. National Stage Application of PCT Application Number PCT/IB2009/006883, filed on Sep. 17, 2009, which claims the priority benefit from U.S. Provisional Patent Application No. 61/100,257, filed on Sep. 25, 2008, of which the contents of these applications are incorporated by reference herein.

TECHNICAL FIELD

This description relates to wireless networks.

BACKGROUND

In wireless networks, mobile stations may communicate with an access node, which may relay data to other mobile stations. At times, it may be desirable for two or more mobile stations to communicate with each other directly in a device-to-device manner rather than communicating via the access node.

SUMMARY

According to one example embodiment, a method may include synchronizing, by an access node in a wireless network, with a first mobile station. The method may also include synchronizing with a second mobile station. The method may also include compiling a device-to-device group, the device-to-device group including at least the first mobile station and the second mobile station. The method may also include sending a first connection message to the first mobile station, the first connection message including timing advance parameters of both the first mobile station and the second mobile station. The method may also include sending a second connection message to the second mobile station.

According to another example embodiment, a method may include synchronizing, by a first mobile station in a wireless network, with an access node. The method may also include receiving a connection message from the access node, the connection message including timing advance parameters of mobile stations in a device-to-device group and a maximum device-to-device transmission power level allowed, the device-to-device group including at least the first mobile station and a second mobile station. The method may also include repeatedly sending synchronization messages to the second mobile station until receiving a synchronization acknowledgment message from the second mobile station, the synchronization messages being sent with an initial transmission power level based on a difference between timing advance parameters of the first mobile station and the second mobile station, and increasing transmission power levels to the maximum device-to-device transmission power included in the connection message. The method may also include receiving the synchronization acknowledgment message from the second mobile station. The method may also include sending a transmission power message to the second mobile station, the transmission power message including a transmission power level of the synchronization message corresponding to the received synchronization acknowledgment message.

According to another example embodiment, a method may include synchronizing, by a first mobile station in a wireless network, with an access node. The method may also include receiving a synchronization message from a second mobile station. The method may also include sending synchronization acknowledgment message to the second mobile station. The method may also include receiving a transmission power message from the second mobile station, the transmission power message including a transmission power level of the synchronization message corresponding to the received synchronization acknowledgment message.

According to another example embodiment, an apparatus may include a controller and a transceiver. The controller may be configured to synchronize with a first mobile station via the transceiver, synchronize with a second mobile station via the wireless transceiver, compile a device-to-device group, the device-to-device group including at least the first mobile station and the second mobile station, generate a first connection message for the first mobile station, the first connection message including timing advance parameters of both the first mobile station and the second mobile station, and generate a second connection message for the second mobile station. The transceiver, which may include a wireless transceiver configured to communicate via an air interface, may be configured to send messages generated by the controller and receive and forward messages to the controller.

According to another example embodiment, an apparatus may include a controller and a transceiver. The controller may be configured to synchronize with an access node, process a connection message received from the access node, the connection message comprising e.g. timing advance parameters of mobile stations in a device-to-device group and/or a maximum device-to-device transmission power level allowed, the device-to-device group including at least the first mobile station and a second mobile station, repeatedly generate synchronization messages for the second mobile station until receiving a synchronization acknowledgment message from the second mobile station, the synchronization messages being sent with an initial transmission power level based on a difference between timing advance parameters of the first mobile station and the second mobile station, and increasing transmission power levels to the maximum device-to-device transmission power included in the connection message, process the synchronization acknowledgment message from the second mobile station, and generate a transmission power message for the second mobile station, the transmission power message including a transmission power level of the synchronization message corresponding to the received synchronization acknowledgment message. The transceiver, which may include a wireless transceiver configured to communicate via an air interface, may be configured to send messages generated by the controller and receive and forward messages to the controller.

According to another example embodiment, an apparatus may include a controller and a transceiver. The controller may be configured to synchronize with an access node, process a synchronization message received from a second mobile station, generate a synchronization acknowledgment message for the second mobile station, and process a transmission power message from the second mobile station, the transmission power message including a transmission power level of the synchronization message corresponding to the received synchronization acknowledgment message. The transceiver, which may include a wireless transceiver configured to communicate via an air interface, may be configured to send messages generated by the controller and receive and forward messages to the controller.

According to another example embodiment, a computer program product may facilitate device-to-device communication between mobile stations. The computer program product may be tangibly embodied on a computer storage medium and include executable code that, when executed, is configured to cause an access node which serves a plurality of mobile stations to synchronize with a first mobile station, synchronize with a second mobile station, compile a device-to-device group, the device-to-device group including at least the first mobile station and the second mobile station, send a first connection message to the first mobile station, the first connection message including timing advance parameters of both the first mobile station and the second mobile station, and send a second connection message to the second mobile station.

According to another example embodiment, a computer program product may be used for device-to-device communication between mobile stations. The computer program product may be tangibly embodied on a computer storage medium and include executable code that, when executed, is configured to cause a first mobile station to synchronize with an access node which serves a plurality of mobile stations, receive a connection message from the access node, the connection message including timing advance parameters of mobile stations in a device-to-device group and a maximum device-to-device transmission power level allowed, the device-to-device group including at least the first mobile station and a second mobile station, repeatedly send synchronization messages to the second mobile station until receiving a synchronization acknowledgment message from the second mobile station, the synchronization messages being sent with an initial transmission power level based on a difference between timing advance parameters of the first mobile station and the second mobile station, and increasing transmission power levels to the maximum device-to-device transmission power included in the connection message, receive the synchronization acknowledgment message from the second mobile station, and send a transmission power message to the second mobile station, the transmission power message including a transmission power level of the synchronization message corresponding to the received synchronization acknowledgment message.

According to another example embodiment, a computer program product may be used for device-to-device communication between mobile stations. The computer program product may be tangibly embodied on a computer storage medium and include executable code that, when executed, is configured to cause a first mobile station to synchronize with an access node which serves a plurality of mobile stations, receive a synchronization message from a second mobile station, send a synchronization acknowledgment message to the second mobile station, and receive a transmission power message from the second mobile station, the transmission power message including a transmission power level of the synchronization message corresponding to the received synchronization acknowledgment message.

The details of one or more implementations are set forth in the accompanying drawings and the description below. Other features will be apparent from the description and drawings, and from the claims.

DETAILED DESCRIPTION

Figure 1A:
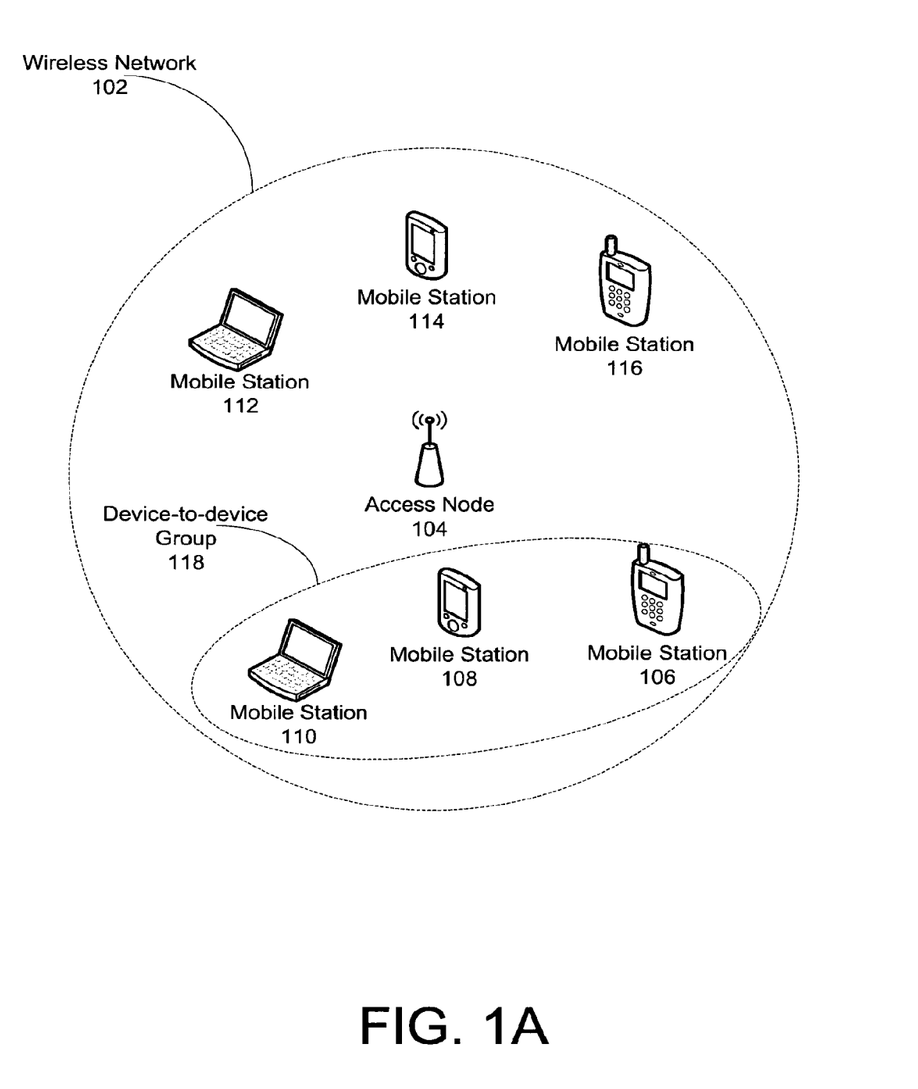
FIG. 1A is a diagram of a wireless network according to an example embodiment.

FIG. 1A is a block diagram of a wireless network 102 according to an example embodiment. The wireless network 102 may include a long term evolution (LTE) network using an evolved UTRA (EUTRA) air interface, an IEEE 802.11 wireless local area network (WLAN), an IEEE 802.16 Worldwide Interoperability for Microwave Access (WiMAX) network, or a cellular telephone network, according to example embodiments.

The wireless network 102 may include an access node 104. The access node 104 may include an LTE node B, such as an enhanced node B, a WLAN access point, a WiMAX base station, or a cellular telephone base station, according to example embodiments. The access node 104 may be coupled to a backbone network which may, for example, provide access to the Internet.

The access node 104 may wirelessly communicate with one or more mobile stations 106, 108, 110, 112, 114, 116. The mobile stations 106, 108, 110, 112, 114, 116 may communicate wirelessly with the access node 104 as well as with each other, and may include cellular telephones, smartphones, personal digital assistants (PDAs), or laptop or notebook computers, according to example embodiments. While six mobile stations 106, 108, 110, 112, 114, 116 are shown in the example embodiment in FIG. 1A, any number of mobile stations 106, 108, 110, 112, 114, 116 may be included in the wireless network 102, according to various example embodiments.

The E-UTRA air interface supports both frequency division duplex (FDD) and time division duplex (TDD) modes of operation. In an example embodiment, the access node 104 and mobile stations 106, 108, 110, 112, 114, 116 may utilize an orthogonal frequency division multiple access (OFDMA) scheme or a single carrier frequency division multiple access (SC-FDMA) scheme, in which each mobile station 106, 108, 110, 112, 114, 116 is allocated a time and frequency resource block for communicating with the base station 104. Data may be sent and received using different modulation and coding scheme (MCS), for example quaternary phase shift keying (QPSK) and/or quadrature amplitude modulation (QAM), according to example embodiments.

Spectral resources may be assigned for each of the mobile stations 106, 108, 110, 112, 114, 116 to communicate with the access point 104 and/or with each other. The spectral resources may be divided into physical resource blocks (PRBs). The physical resource blocks may specify the fixed frequency bands such as subcarriers or blocks of subcarriers. In an example embodiment, the physical resource blocks may each include twelve subcarriers with a bandwidth of fifteen kilohertz (15 kHz) each, for 180 kHz for each physical resource block. In an example embodiment, the base station 104 may allocate the spectral resources to the mobile stations 106, 108, 110 in physical resource blocks which each include one PRBs (180 kHz) or several PRBs with whole uplink sub-frames allocation in packet arrival interval.

In the FDD mode of E-UTRA, certain carrier frequencies and/or frequency bands may be assigned for uplink communication from the mobile station(s) 106, 108, 110, 112, 114, 116 to the access node 104, and certain carrier frequencies and/or frequency bands may be assigned for downlink communication from the access node 104 to the mobile station(s) 106, 108, 110, 112, 114, 116. For example, physical resource blocks with certain frequency bands may be assigned to each mobile station 106, 108, 110, 112, 114, 116 for each of uplink and downlink communication.

In an example embodiment, the physical resource blocks used for uplink communication may, in device-to-device communication mode, be used for communication between the mobile stations 106, 108, 110, 112, 114, 116. In this example, the physical resource blocks used for downlink communication may still be available when the mobile stations 106, 108, 110, 112, 114, 116 engage in device-to-device communication, enabling the access node 104 to send messages to the mobile stations 106, 108, 110, 112, 114, 116, such as to instruct a mobile station 106, 108, 110, 112, 114, 116 to cease engaging in device-to-device communication, and communicate via the access node 104.

The mobile stations 106, 108, 110, 112, 114, 116 may, upon entering the wireless network 102, synchronize with the access node 104. The mobile stations 106, 108, 110, 112, 114, 116 may, for example, send preambles, such as random access preambles, to indicate their identity and their entrance into the wireless network 102. The access node 104 may synchronize with each of the mobile stations 106, 108, 110, 112, 114, 116 by receiving the respective preambles, and, upon receiving and processing the preambles, determine an identity of the mobile station 106, 108, 110, 112, 114, 116, and may send a response to the preamble. The response may include timing alignment information and an initial uplink grant. The initial uplink grant may, for example, include physical resource blocks for uplink communication with the access node 104, and the timing alignment information may indicate a timing pattern for when the mobile station 106, 108, 110, 112, 114, 116 should send messages.

The access node 104 may compile a device-to-device group 118. The device-to-device group 118 may include any number of mobile stations 106, 108, 110, 112, 114, 116 in the wireless network 102. The access node 104 may compile the device-to-device group 118 based, for example, on determining that the mobile stations 106, 108, 110, 112, 114, 116 within the device-to-device 118 group are within a predetermined distance from each other (such as based on global positioning system coordinates transmitted from the respective mobile stations 106, 108, 110, 112, 114, 116 to the access node 104). As another example, the access node 104 may compile the device-to-device group 118 based on determining that the mobile stations 106, 108, 110, 112, 114, 116 within the device-to-device group 118 have similar timing advance parameters, which may indicate their proximity, and as a further means of establishing their proximity, may have similar Direction of Arrival (DoA) as estimated in the access node 104, which may indicate whether they are approximately on the same line of sight to the access node 104. The access node 104 may also compile the device-to-device group 118 based on the mobile stations 106, 108, 110, 112, 114, 116 communicating with each other rather than devices outside the wireless network 102. The access node 104 may add or remove mobile stations 106, 108, 110, 112, 114, 116 from the device-to-device group 118 based on the above or other factors, according to an example embodiment.

Figure 1B:
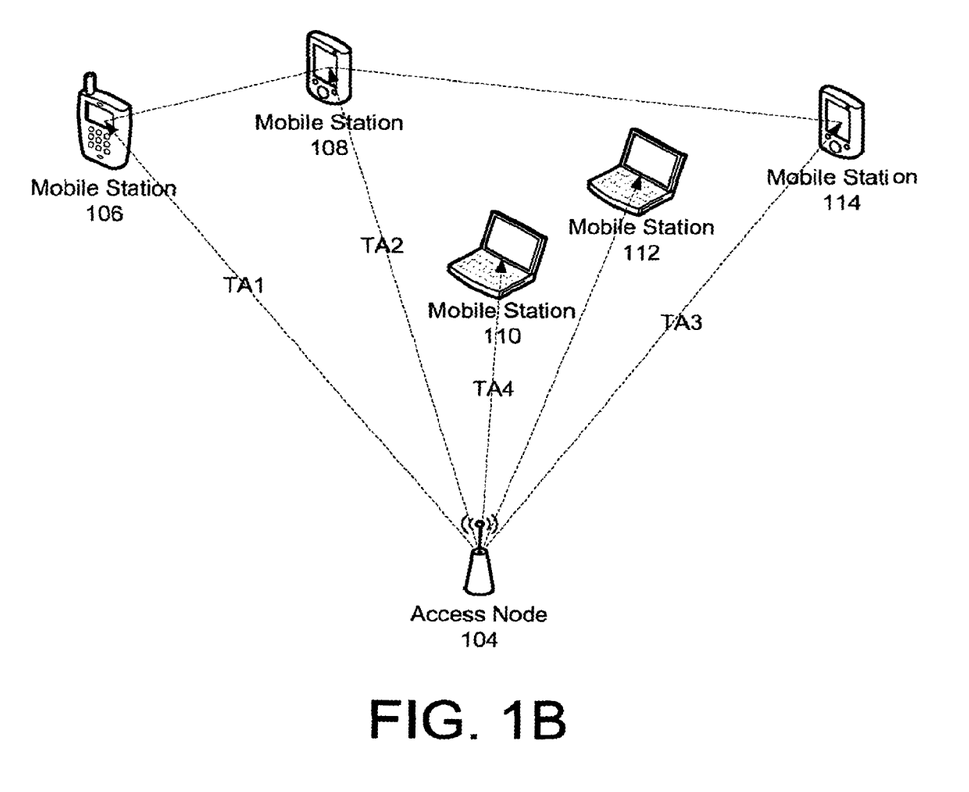
FIG. 1B is a diagram showing distances between an access node and mobile stations according to an example embodiment.

FIG. 1B is a diagram showing distances between the access node 104 and mobile stations 106, 108, 110, 112, 114, 116 according to an example embodiment. In this example, the distances and timing advances TA1, TA2, TA3 between the access node 104 and the mobile stations 106, 108, 114 are approximately the same. Based on the similar timing advances TA1, TA2, TA3, the access node 104 may determine that the mobile stations 106, 108, 114 are close to each other, and form a device-to-device group 118 which includes the mobile stations 106, 108, 114. However, in this example, the mobile stations 106, 108 may be proximal to each other, but the mobile station 114 may not be proximal to either of the mobile stations 106, 108. Also in this example, while the timing advance TA4 of the mobile station 110 may be dissimilar to the timing advance TA2 of the mobile station 108, the mobile station 110 may be proximal to the mobile station 108. Thus, the timing advance parameters of the mobile stations 106, 108, 110, 112, 114, 116 with respect to the access node 104 may provide partial, but not complete, estimates of the distances of the mobile stations 106, 108, 110, 112, 114, 116 from each other. The timing advance parameters of the mobile stations 106, 108, 110, 112, 114, 116 with respect to the access node 104 may also provide only partial estimates of timing advance parameters between the mobile stations 106, 108, 110, 112, 114, 116 in device-to-device communication mode.

The access node 104 may, after compiling the device-to-device group 118, initiate communication between the mobile stations 106, 108, 110 in the device-to-device group 118. The access node 104 may, for example, send connection messages to the mobile stations 106, 108, 110 in the device-to-device group 118. The access node 104 may send the connection message based on the access node 104 determining that two or more of the mobile stations 106, 108, 110 should engage in device-to-device communication, or based on one or more of the mobile stations 106, 108, 110 sending a request for the connection message to the access node 104. Either the access node 104 or the mobile station 106, 108, 110 may have determined that device-to-device communication is feasible, such as based on a determined distance between the mobile stations 106, 108, 110. The connection messages may, for example, be sent separately to each mobile station 106, 108, 110 in the device-to-device group 118, or may be sent together in a single broadcast message which is sent to all the mobile stations 106, 108, 110 in the device-to-device group 118.

The connection messages may, for example, include timing advance parameters of any or all mobile stations 106, 108, 110 in the device-to-device group 118. The timing advance parameters may include frame timing synchronization information, which may allow the mobile stations 106, 108, 110 to synchronize with each other more quickly upon engaging in device-to-device communication. The timing advance parameters may, for example, be based on a time lapse for messages to be sent between the access node 104 and the respective mobile stations 106, 108, 110, and may be a function of the distance between the access node 104 and the respective mobile stations 106, 108, 110. In an example embodiment, the connection messages may also include connection identifiers of each of the mobile stations 106, 108, 110 in the device-to-device group 118. The connection messages may also assign resource blocks to the mobile stations 106, 108, 110 for device-to-device communication, such as the resource block previously assigned to the mobile stations 106, 108, 110 for uplink communication with the access node 104.

Upon receiving the connection message, one or more of the mobile stations 106, 108, 110, such as a first mobile station 106, may send a synchronization message to one or more of the other mobile stations 108, 110. The first mobile station 106 may, for example send the synchronization message to mobile station 108 with a low initial transmission power level based on the difference between its timing advance parameter and that of the other mobile stations 108, as it gives some knowledge of propagation delay between them, (or distance or path loss). The timing advance parameters received from the access node 104 may allow the mobile stations 106, 108 to synchronize more quickly, and may allow more power efficient transmission and hence lower interference than if the synchronization message were sent without knowledge of the timing advance parameters.

In an example embodiment, the access node 104 may not compile the device-to-device group 118. In this example, the access node 104 may consider all mobile stations 106, 108, 110, 112, 114, 116 which are served by the access node 104, such as all mobile stations 106, 108, 110, 112, 114, 116 within a particular cell or sector, to be members of the device-to-device group. The mobile stations 106, 108, 110, 112, 114, 116 may determine which other mobile station(s) to engage in device-to-device communication based, for example, on information such as the timing advance parameters included in the connection message.

After sending the synchronization message to the second mobile station 108, the first mobile station 106 may wait for a synchronization acknowledgment message from the second mobile station 108. If the first mobile station 106 does not receive a synchronization acknowledgment message from the second mobile station 108, the first mobile station 106 may resent the synchronization message with a higher transmission power level. The first mobile station 106 may repeatedly send synchronization messages to the second mobile station 108 with increasing transmission power levels until receiving the synchronization acknowledgment message from the second mobile station 108.

Upon receiving the synchronization message from the first mobile station 106, the second mobile station 108 may send the synchronization acknowledgment message to the first mobile station 106 at a maximum allowed transmission power. The synchronization acknowledgment message may indicate which synchronization message is being acknowledged. Upon receiving the synchronization acknowledgment message from the second mobile station 108 identifying which synchronization message is acknowledged, the first mobile station 106 may send a message to the second mobile station indicating the transmission power of the synchronization message which was acknowledged. This message, which may be referred to as a "transmission power message," may also include a timing advance parameter for device-to-device communication between the first mobile station 106 and the second mobile station 108. The timing advance parameter may, for example, be based on a propagation delay of the received synchronization acknowledgment message. The first mobile station 106 and second mobile station 108 may then engage in device-to-device communication at the indicated transmission power level, according to an example embodiment.

Figure 2:
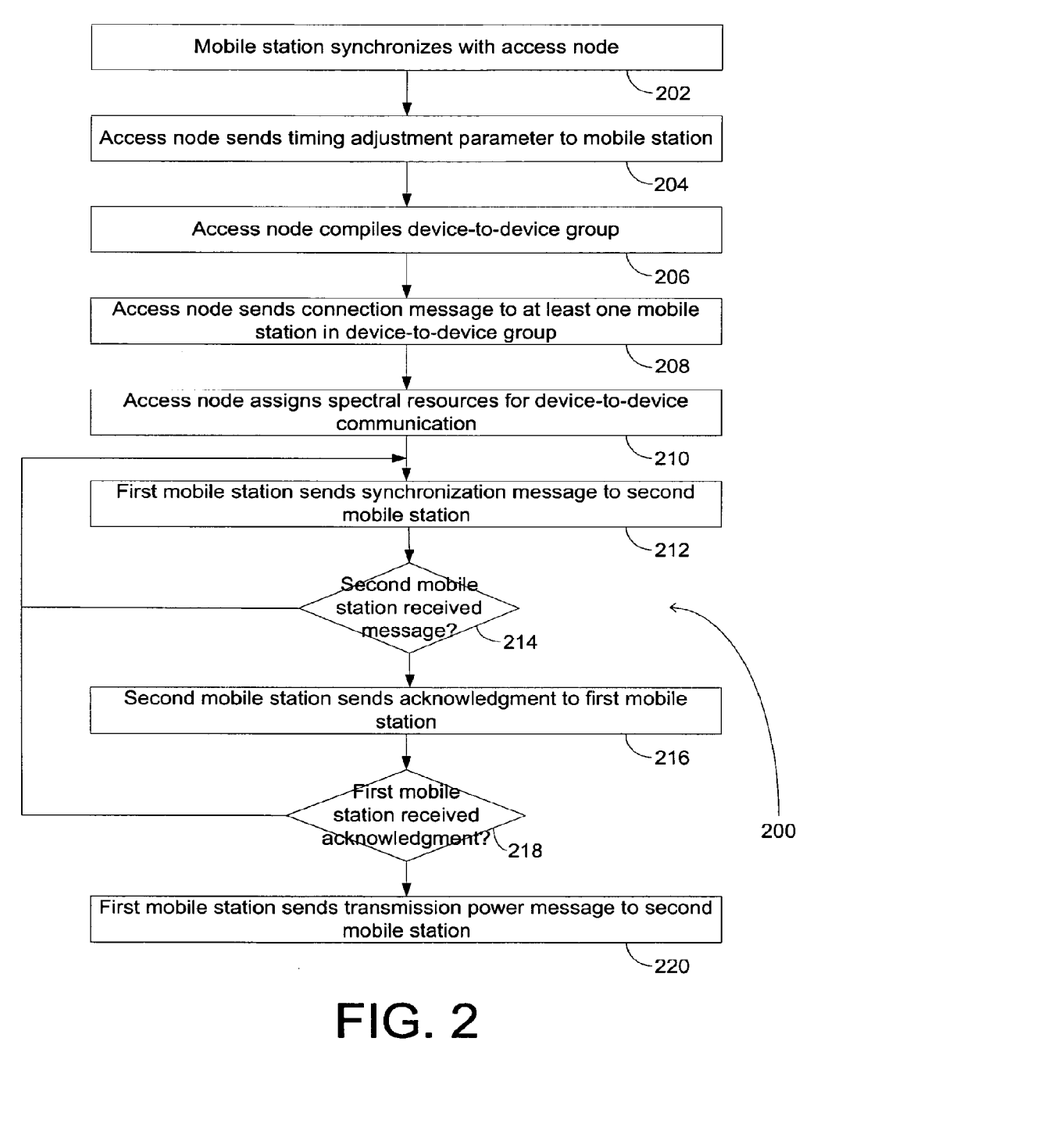
FIG. 2 is a flowchart showing functions performed by the access node and mobile stations according to an example embodiment.

FIG. 2 is a flowchart 200 showing functions performed by the access node and mobile stations according to an example embodiment. In this example, each of the mobile stations 106, 108, 110, 112, 114, 116 may synchronize with the access node 104 (202). The mobile stations 106, 108, 110, 112, 114, 116 may, for example, synchronize with the access node 104 by sending preambles to the access node 104, and receiving responses with timing alignment information, such as timing adjustment parameters, and/or initial uplink grants from the access node 104 (204).

After synchronizing with the mobile stations 106, 108, 110, 112, 114, 116, the access node 104 may compile the device-to-device group 118 (206), and send timing adjustment parameters for all mobile stations in the device-to-device group (206) to all mobile stations in that group. The access node 104 may compile the device-to-device group 118 based on the mobile stations' 106, 108, 110, 112, 114, 116 determined locations, such as based on received global positioning system (GPS) coordinates, timing advance parameters, being in the same sector of a cell, or similar direction of arrival estimated using multi-antenna processing capability, according to example embodiments. The device-to-device group 118 may also be compiled based on a low mobility of the mobile stations 106, 108, 110 in the device-to-device group 118.

The access node 104 may send a connection message to at least one, some, or all of the mobile stations 106, 108, 110 in the device-to-device group 118 (208). The connection message may signal timing advance parameters for each of the mobile stations 106, 108, 110 in the device-to-device group 118, and may indicate a connection identifier for each mobile station 106, 108, 110 in the device-to-device group 118. The connection message may also designate one of the mobile stations 106, 108, 110 as the master which will initiate synchronization and communication with the other mobile stations designated as slaves. The determination of which mobile station 106, 108, 110 will be chosen as the master device may be based, for example, on a distance from the access node 104, a strongest link or signal strength with the access node 104, or first to enter an active state in the wireless network 102. The master device role may also be rotated among the mobile stations 106, 108, 110 in the device-to-device group 118 to avoid excessive battery drain or prevent one slave mobile station 108, 110 from suffering from a relatively poor link with the master mobile station 106.

The access node 104 may also assign spectral resources to the mobile stations 106, 108, 110 for device-to-device communication (210). The access node 104 may, for example, determine a maximum transmission power for device-to-device communication, and may allocate spectral resources for device-to-device communication, such as allocating uplink resources for device-to-device communication.

After being assigned spectral resources, the first mobile station 106 may send a synchronization message to the second mobile station 108 (212) The synchronization message may have an initial transmission power level based on the difference between its timing advance parameter and that of the other mobile stations 108. If the second mobile station 108 receives the synchronization message (214), the second mobile station 108 may send an acknowledgment to the first mobile station 106 (216). The second mobile station 108 may send the acknowledgment to the first mobile station at a maximum allowed transmission power level. The first mobile station 106 may wait a predetermined time to check whether it receives an acknowledgment from the second mobile station 108 (218). If the first mobile station 106 does not receive an acknowledgment, then the first mobile station 106 may resent the synchronization message to the second mobile station 108 (212), with a higher transmission power level. If the first mobile station 106 does receive the acknowledgment, the first mobile station 106 may send a transmission power message to the second mobile station (220). The transmission power message may have a transmission power which is the same as the transmission power of the synchronization message which was acknowledged, and may indicate the transmission power, as well as a timing advance parameter for communication between the first mobile station 106 and the second mobile station 108, according to an example embodiment.

Figure 3:
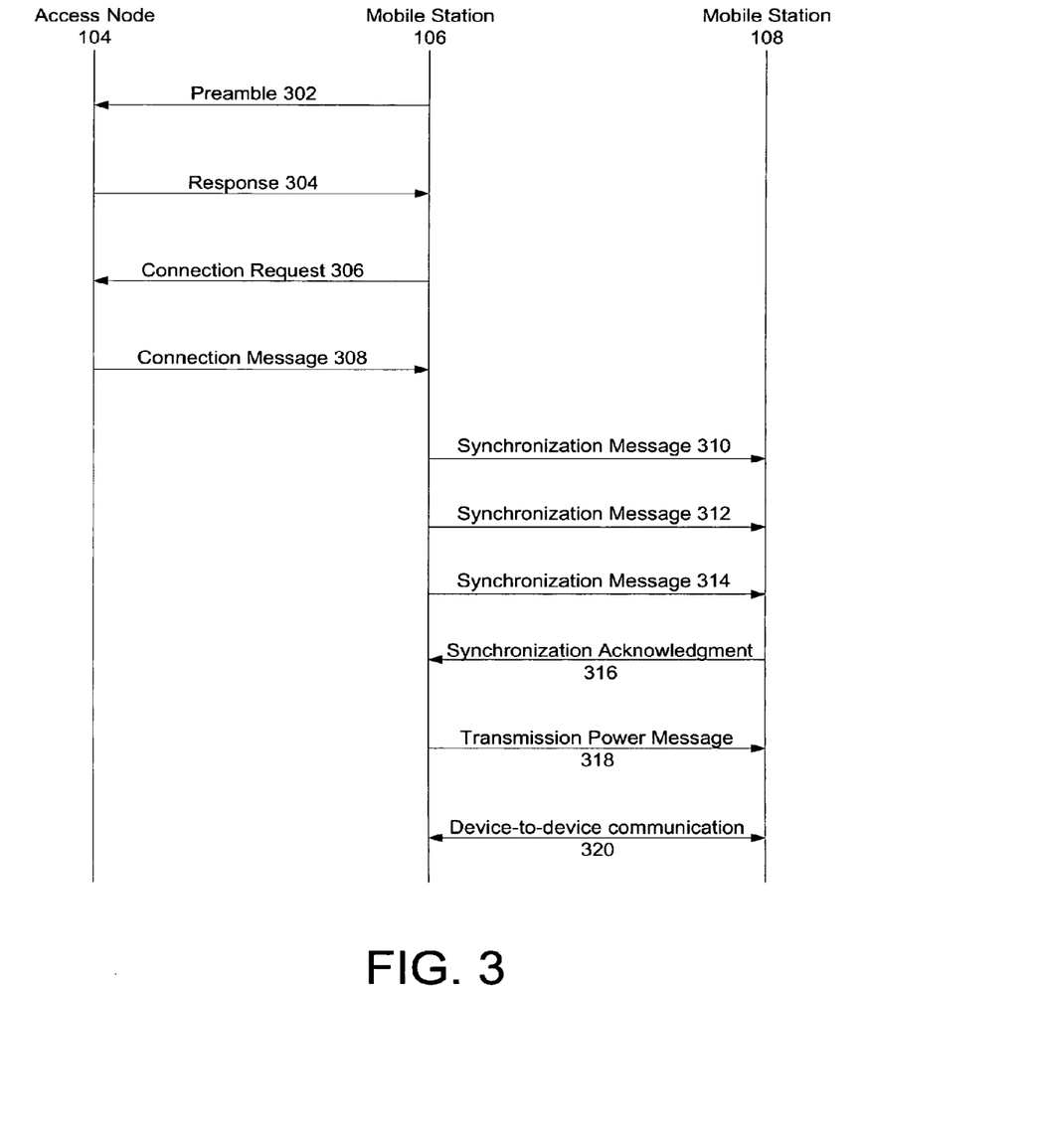
FIG. 3 is a vertical time-sequence diagram showing messages exchanged between an access node and mobile stations according to an example embodiment.

FIG. 3 is a vertical time-sequence diagram showing messages exchanged between an access node 104 and mobile stations 106, 108 according to an example embodiment. In this example, the first mobile station 106 may synchronize with the access node 104. The first mobile station 106 may synchronize with the access node 104 upon entry into the wireless network 102, or upon powering on, according to example embodiments. The synchronization may include the first mobile station 106 sending a preamble 302 to the access node 104, and the access node 304 sending a response to the first mobile station 106. The preamble 302, which may include a random access preamble, may indicate the first mobile station's 106 identity and the first mobile station's 106 entrance into the wireless network 102. Upon receiving and processing the preamble 302, the access node 104 may determine an identity of the first mobile station 106 and may send the response 304 to the preamble 302. The response 304 may include timing alignment information and an initial uplink grant. The initial uplink grant may, for example, include physical resource blocks for uplink communication with the access node 104, and the timing alignment information may indicate a timing pattern for when the first mobile station 106 should send messages. While not shown in FIG. 3, these synchronization procedures may also be performed between the access node 104 and the second mobile station 108, or any other mobile stations in the device-to-device group 118, according to an example embodiment.

Either the first mobile station 106 or the access node 104 may determine that the mobile station 106 should engage in device-to-device communication with the second mobile station 108 (or any other mobile station in the device-to-device group 118). If the first mobile station 106 makes the determination, the first mobile station 106 may send a connection request 306 to the access node 104. The connection request 306 may indicate that the first mobile station 106 desires to engage in device-to-device communication with another mobile station. In response to receiving the connection request 306, the access node 104 may send a connection message 308 to the first mobile station 106. In an example in which the access node 104 made the determination that the mobile station 106 should engage in device-to-device communication, then the access node 104 may send the connection message 308 to the mobile station 106 without receiving a message from the first mobile station.

The connection message 308 also be sent to other mobile stations 108, 110 in the device-to-device group 108, and may, for example, be sent separately to each mobile station 106, 108, 110 in the device-to-device group 118, or may be sent together in a single broadcast message which is sent to all the mobile stations 106, 108, 110 in the device-to-device group. The connection message 308 may, for example, include timing advance parameters of the mobile stations 106, 108. The timing advance parameters may include frame timing synchronization information, which may allow the mobile stations 106, 108 to synchronize with each other more quickly upon engaging in device-to-device communication. The timing advance parameters may, for example, be based on a time lapse for messages to be sent between the access node 104 and the respective mobile stations 106, 108, and may be a function of the distance between the access node 104 and the respective mobile stations 106, 108. In an example embodiment, the connection message 308 may also include connection identifiers of each of the mobile stations 106, 108. The connection message 308 may also assign resource blocks to the mobile stations 106, 108 for device-to-device communication, such as the resource block previously assigned to the mobile stations 106, 108 for uplink communication with the access node 104.

Upon receiving the connection message 308 from the access node 104, the first mobile station 106 may send a synchronization message 310 to the second mobile station 108. The synchronization message 310 may be based on the timing advance parameters included in the connection message 308, such as a difference between the timing advance parameters of the first mobile station 106 and the second mobile station 108, and may be sent at a minimum transmission power level. If the first mobile station 106 does not receive an acknowledgment, the first mobile station 106 may send further synchronization messages 312, 314, with increasing transmission power levels, until receiving a synchronization acknowledgment 316 from the second mobile station 108. The synchronization acknowledgment 316 may be sent with a maximum allowed transmission power, and may indicate which synchronization message 310, 312, 314 is being acknowledged. Upon receiving the synchronization acknowledgment 316, the first mobile station 106 may sent a transmission power message 318 to the second mobile station 108. The transmission power message may be sent at the transmission power level of the successful synchronization message 310, 312, 314, may indicate this transmission power level, and may indicate timing advance parameters for communication between the first mobile station 106 and the second mobile station 108. The first mobile station 106 and the second mobile station 108 may thereafter engage in device-to-device communication 320. This process described between the first mobile station 106 and the second mobile station 108 may be engaged in between any number of mobile stations 106, 108, 110 in the device-to-device group 118, according to an example embodiment.

Figure 4:
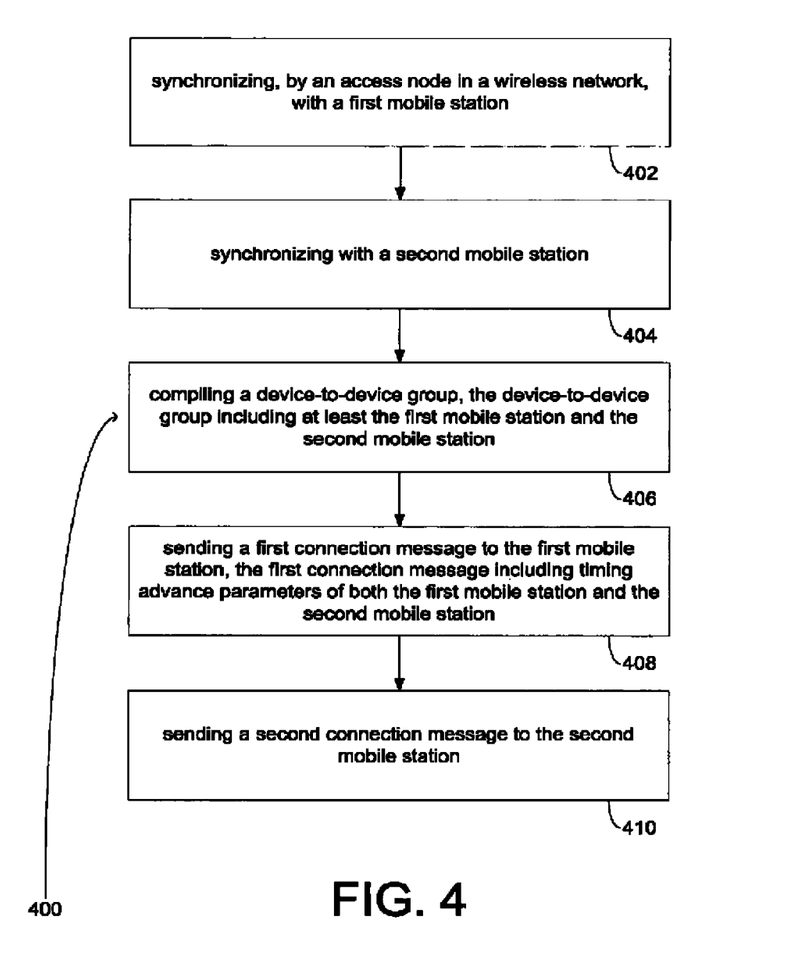
FIG. 4 is a flowchart showing a method according to an example embodiment.

FIG. 4 is a flowchart showing a method 400 according to an example embodiments. In this example, the method 400 may include synchronizing, by an access node in a wireless network, with a first mobile station (402). The method 400 may also include synchronizing with a second mobile station (404). The method 400 may also include compiling a device-to-device group, the device-to-device group including at least the first mobile station and the second mobile station (406). The method 400 may also include sending a first connection message to the first mobile station, the first connection message including timing advance parameters of both the first mobile station and the second mobile station (408). The method 400 may also include sending a second connection message to the second mobile station (410).

In an example embodiment, the synchronizing of the access node with the first mobile station and the second mobile station may each include receiving a preamble from the respective mobile station and sending a response to the respective mobile station, the response including timing alignment information and an initial uplink grant.

In an example embodiment, the compiling may include compiling the device-to-device group based on determining that the first mobile station and the second mobile station have similar timing advance parameters.

In an example embodiment, the compiling may include compiling the device-to-device group based on determining that the first mobile station and the second mobile station have similar Direction of Estimation or Direction of Arrival (DoA) as estimated by the access node.

In an example embodiment, the compiling may include compiling the device-to-device group based on determining that the first mobile station and the second mobile station are within a predetermined distance from each other.

In an example embodiment, the sending the first connection message may include sending the first connection message to the first mobile station, the first connection message including timing advance parameters of both the first mobile station and the second mobile station, the timing advance parameters including frame timing synchronization information.

In an example embodiment, the sending the first connection message may include sending the first connection message to the first mobile station, the first connection message including timing advance parameters and device-to-device connection identifiers of both the first mobile station and the second mobile station.

In an example embodiment, the sending the second connection message may include sending the second connection message to the second mobile station, the second connection message including timing advance parameters of both the first mobile station and the second mobile station.

In an example embodiment, the first connection message and the second connection message may be sent in a single broadcast message to the device-to-device group.

In an example embodiment, the method 400 may further include assigning resource blocks to the first mobile station and the second mobile station for device-to-device communication with each other, the resource blocks being previously assigned to the first mobile station and the second mobile station for uplink communication with the access node.

In an example embodiment, the method 400 may further include synchronizing with additional mobile stations, and sending connection messages to each of the additional mobile stations. In this example, the compiling may include compiling the device-to-device group, the device-to-device group including the first mobile station, the second mobile station, and the additional mobile stations. Also in this example, the sending may include sending the first connection message to the first mobile station, the first connection message including timing advance parameters of both the first mobile station and the second mobile station and the additional mobile stations.

Figure 5:
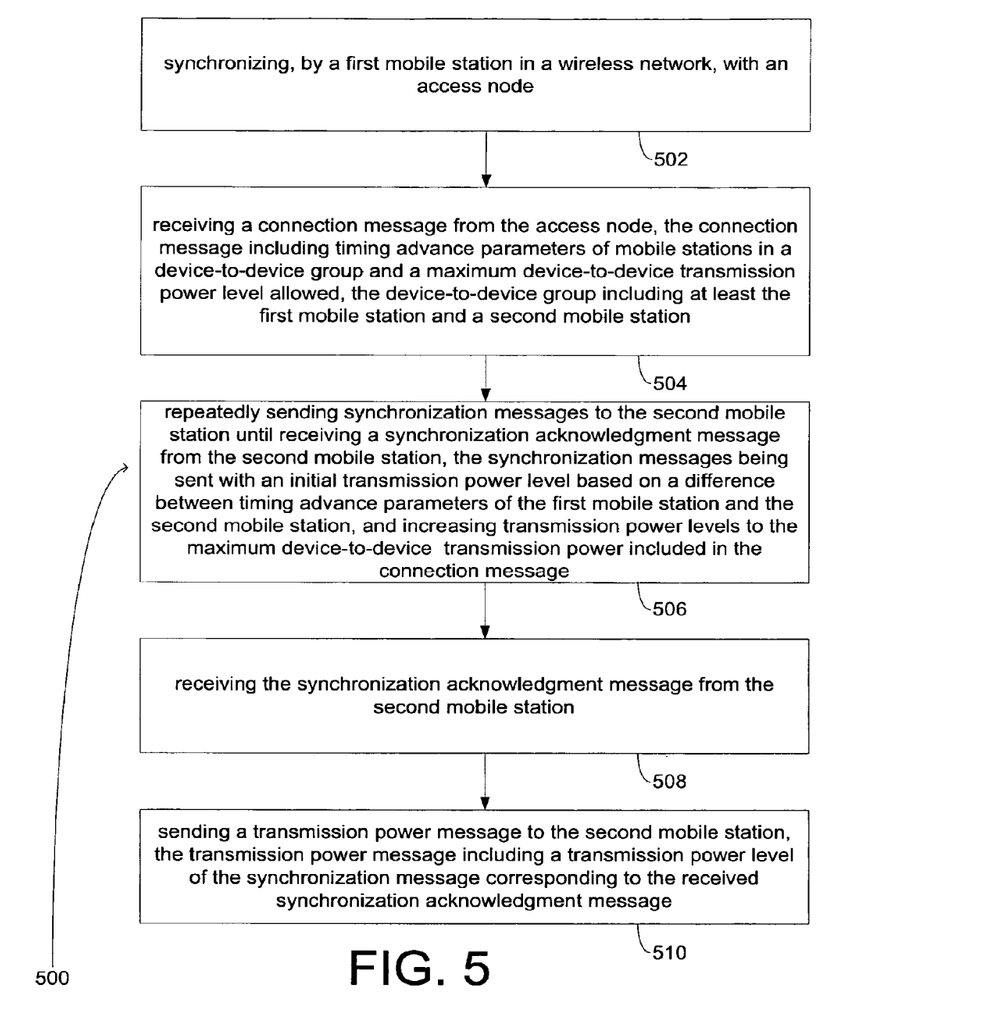
FIG. 5 is a flowchart showing a method according to another example embodiment.

FIG. 5 is a flowchart showing a method 500 according to another example embodiment. In this example, the method 500 may include synchronizing, by a first mobile station in a wireless network, with an access node (502). The method 500 may also include receiving a connection message from the access node, the connection message including timing advance parameters of mobile stations in a device-to-device group and a maximum device-to-device transmission power level allowed, the device-to-device group including at least the first mobile station and a second mobile station (504). The method 500 may also include repeatedly sending synchronization messages to the second mobile station until receiving a synchronization acknowledgment message from the second mobile station, the synchronization messages being sent with an initial transmission power level based on a difference between timing advance parameters of the first mobile station and the second mobile station, and increasing transmission power levels to the maximum device-to-device transmission power included in the connection message (506). The method 500 may also include receiving the synchronization acknowledgment message from the second mobile station (508). The method 500 may also include sending a transmission power message to the second mobile station, the transmission power message including a transmission power level of the synchronization message corresponding to the received synchronization acknowledgment message (510).

In an example embodiment, the synchronizing with the access node may include sending a preamble to the access node, and receiving a response from the access node, the response including timing alignment information and an initial uplink grant.

In an example embodiment, the receiving the connection message may include receiving the connection message from the access node, the connection message including timing advance parameters and directions of arrival of mobile stations in the device-to-device group and the maximum device-to-device transmission power level allowed, and the repeatedly sending synchronization messages includes repeatedly sending synchronization messages to the second mobile station until receiving the synchronization acknowledgment message from the second mobile station, the synchronization messages being sent with an initial transmission power level based on a difference between timing advance parameters of the first mobile station and the second mobile station and the directions of arrival of the first mobile station and the second mobile station, and increasing transmission power levels to the maximum device-to-device transmission power included in the connection message.

In an example embodiment, the sending the transmission power message may include sending the transmission power message to the second mobile station, the transmission power message including the transmission power level of the synchronization message corresponding to the synchronization acknowledgment message and a device-to-device timing advance parameter for device-to-device communication between the first mobile station and the second mobile station, the device-to-device timing advance parameter being based on a propagation delay of the received synchronization acknowledgment message.

In an example embodiment, the synchronizing with the access node may include communicating with the access node in a frequency division duplex (FDD) mode via an uplink channel and a downlink channel. In this example, the method 500 may further include communicating with the second mobile station in a time division duplex (TDD) mode via the uplink channel previously used to communicate with the access node.

In an example embodiment, the method 500 may further include sending, to the access node, a request for the connection message.

In an example embodiment, the method 500 may further include determining that device-to-device communication with the second mobile station is feasible, and sending, to the access node, a request for the connection message based on the determining.

Figure 6:
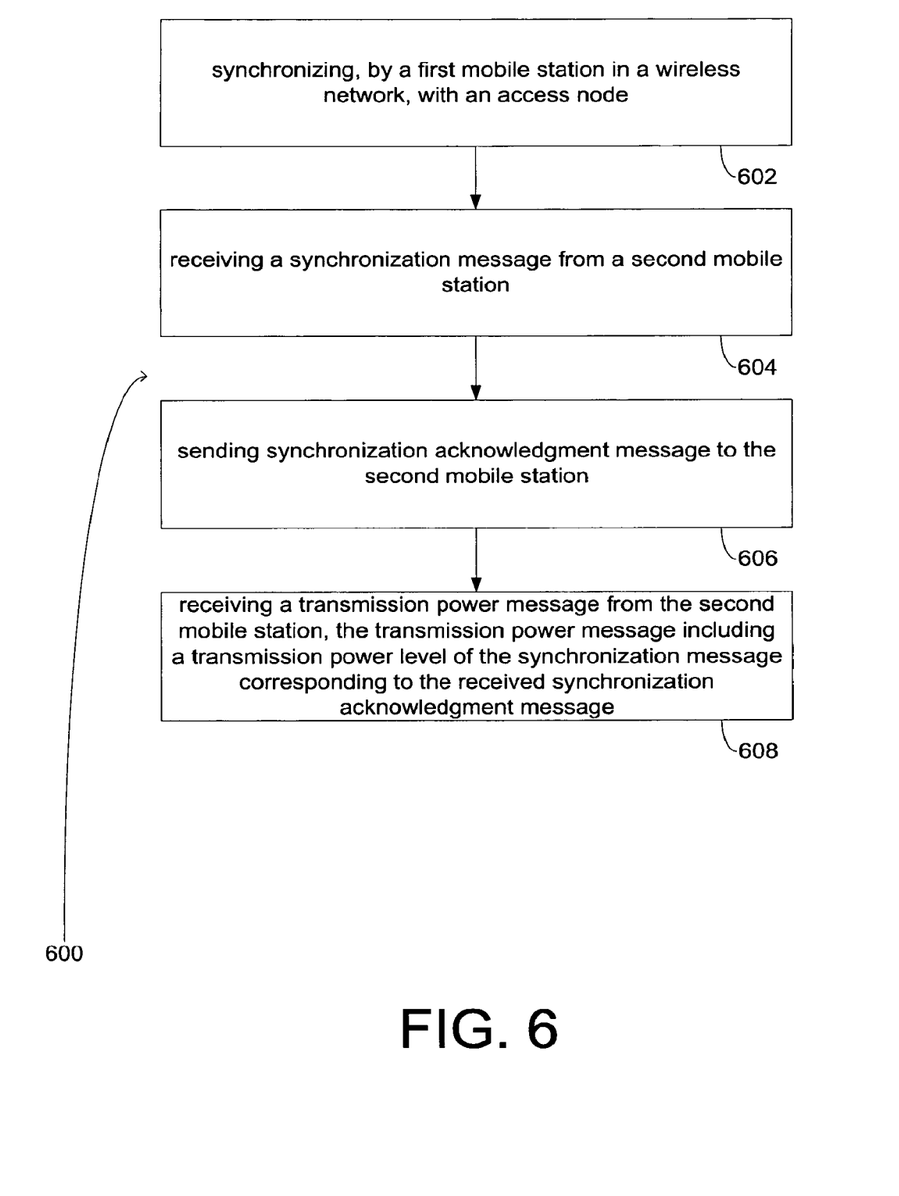
FIG. 6 is a flowchart showing a method according to another example embodiment.

FIG. 6 is a flowchart showing a method 600 according to another example embodiment. In this example, the method 600 may include synchronizing, by a first mobile station in a wireless network, with an access node (602). The method 600 may also include receiving a synchronization message from a second mobile station (604). The method 600 may also include sending a synchronization acknowledgment message to the second mobile station (606). The method 600 may also include receiving a transmission power message from the second mobile station, the transmission power message including a transmission power level of the synchronization message corresponding to the received synchronization acknowledgment message (608).

In an example embodiment, the synchronizing with the access node may includes sending a preamble to the access node, and receiving a response from the access node, the response including timing alignment information and an initial uplink grant.

In an example embodiment, the receiving the transmission power message may include receiving the transmission power message from the second mobile station, the transmission power message including the transmission power level of the synchronization message corresponding to the synchronization acknowledgment message and a device-to-device timing advance parameter for device-to-device communication between the first mobile station and the second mobile station.

In an example embodiment, the synchronizing with the access node may include communicating with the access node in a frequency division duplex (FDD) mode via an uplink channel and a downlink channel, and the method 600 may further include communicating with the second mobile station in a time division duplex (TDD) mode via the uplink channel previously used to communicate with the access node.

Figure 7:
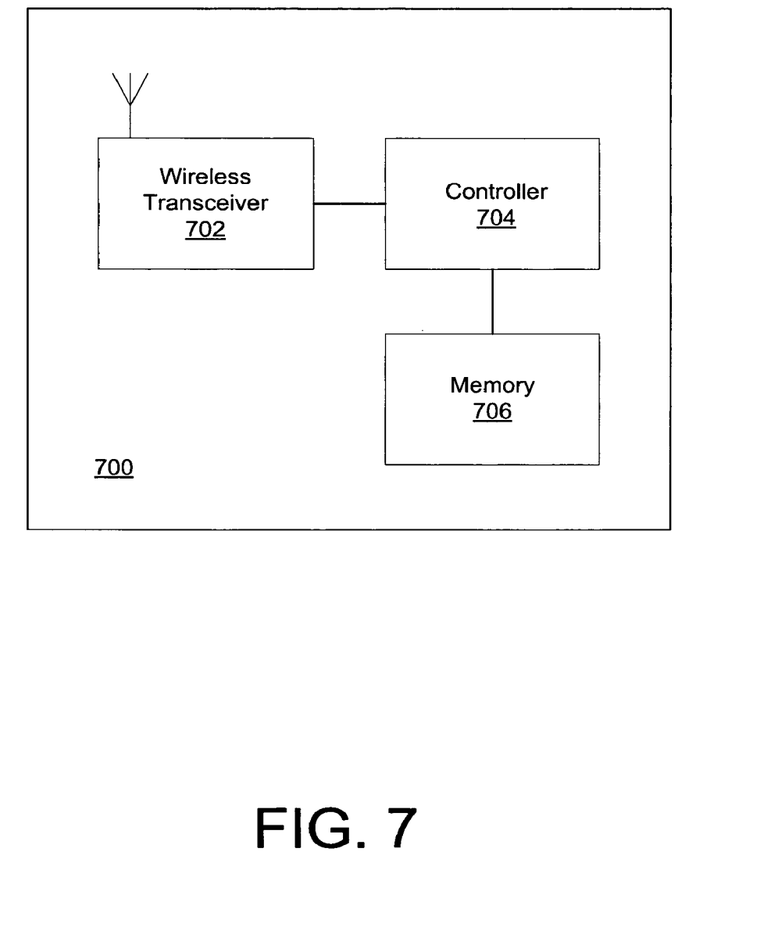
FIG. 7 is a block diagram of a wireless station according to an example embodiment.

FIG. 7 is a block diagram of a wireless station (such as an access node 104 or mobile station 106, 108, 110, 112, 114, 116) 700 according to an example embodiment. The wireless station 700 may include, for example, a transceiver (or wireless interface) 702, including a transmitter to transmit signals and a receiver to receive signals, such as a wireless transceiver configured to communicate via an air interface, a controller 704 to control operation of the station and execute instructions or software, and a memory 706 to store data and/or instructions. Controller 704 may also make decisions or determinations, generate frames or messages for transmission, decode received frames or messages for further processing, and other tasks or functions described herein.

Controller 704 may be programmable and capable of executing software or other instructions stored in the memory 706 or on other computer storage media to perform the various tasks and functions described above, such as one or more of the tasks or methods described above.

Implementations of the various techniques described herein may be implemented in digital electronic circuitry, or in computer hardware, firmware, software, or in combinations of them. Implementations may implemented as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the true spirit of the embodiments of the invention.

The invention claimed is:
1. A method comprising:
  synchronizing, by an access node in a wireless network, with a first mobile station;
  synchronizing with a second mobile station;
  compiling a device-to-device group, the device-to-device group comprising at least the first mobile station and the second mobile station;
  sending a first connection message to the first mobile station, the first connection message comprising timing advance parameters of both the first mobile station and the second mobile station; and
  sending a second connection message to the second mobile station,
  wherein the compiling comprises compiling the device-to-device group based at least partly on determining that the first mobile station and the second mobile station are within a predetermined distance from each other, based on their timing advance parameters,
wherein the first connection message comprises a transmission power message, and wherein the timing advance parameters are based on a propagation delay of a received synchronization acknowledgement message.

2. The method of claim 1, wherein the compiling comprises compiling the device-to-device group based at least partly on determining that the first mobile station and the second mobile station have similar direction of arrival as estimated by the access node.

3. The method of claim 1, wherein the first connection message and the second connection message are sent in a single broadcast message to the device-to-device group.

4. The method of claim 1, further comprising assigning resource blocks to the first mobile station and the second mobile station for device-to-device communication with each other, the resource blocks being previously assigned to the first mobile station and the second mobile station for uplink communication with the access node.

5. An apparatus comprising:
at least one processor; and
  at least one memory including a computer program code, wherein the at least one memory and the computer program code are configured, with the at least one processor, to cause the apparatus to:
    synchronize with a first mobile station;
    synchronize with a second mobile station;
  compile a device-to-device group, the device-to-device group comprising at least the first mobile station and the second mobile station;
  send a first connection message for the first mobile station, the first connection message comprising timing advance parameters of both the first mobile station and the second mobile station; and
  send a second connection message for the second mobile station,
  wherein the compiling comprises compiling the device-to-device group based at least partly on determining that the first mobile station and the second mobile station are within a predetermined distance from each other, based on their timing advance parameters,
  wherein the first connection message comprises a transmission power message, and wherein the timing advance parameters are based on a propagation delay of a received synchronization acknowledgement message.

6. The apparatus of claim 5, wherein the compiling comprises compiling the device-to-device group based at least partly on determining that the first mobile station and the second mobile station have similar direction of arrival as estimated by the access node.

7. The apparatus of claim 5, wherein the at least one memory and the computer program code are further configured, with the at least one processor, to cause the apparatus to send the first connection message and the second connection message in a single broadcast message to the device-to-device group.

8. The apparatus of claim 5, wherein the at least one memory and the computer program code are further configured, with the at least one processor, to cause the apparatus to: assign resource blocks to the first mobile station and the second mobile station for device-to-device communication with each other, the resource blocks being previously assigned to the first mobile station and the second mobile station for uplink communication with the access node.

9. A computer program product for facilitating device-to-device communication between mobile stations, the computer program product being tangibly embodied on a non-transitory computer storage medium and comprising executable code that, when executed, is configured to cause an access node which serves a plurality of mobile stations to:
  synchronize with a first mobile station;
  synchronize with a second mobile station;
  compile a device-to-device group, the device-to-device group comprising at least the first mobile station and the second mobile station;
  send a first connection message to the first mobile station, the first connection message comprising timing advance parameters of both the first mobile station and the second mobile station; and
  send a second connection message to the second mobile station,
  wherein the compiling comprises compiling the device-to-device group based at least partly on determining that the first mobile station and the second mobile station are within a predetermined distance from each other, based on their timing advance parameters,
  wherein the first connection message comprises a transmission power message, and wherein the timing advance parameters are based on a propagation delay of a received synchronization acknowledgement message
  wherein the compiling comprises compiling the device-to-device group based at least partly on determining that the first mobile station and the second mobile station are within a predetermined distance from each other, based on their timing advance parameters,
  wherein the first connection message comprises a transmission power message, and wherein the timing advance parameters are based on a propagation delay of a received synchronization acknowledgement message.

* * * * *